Figure 1:
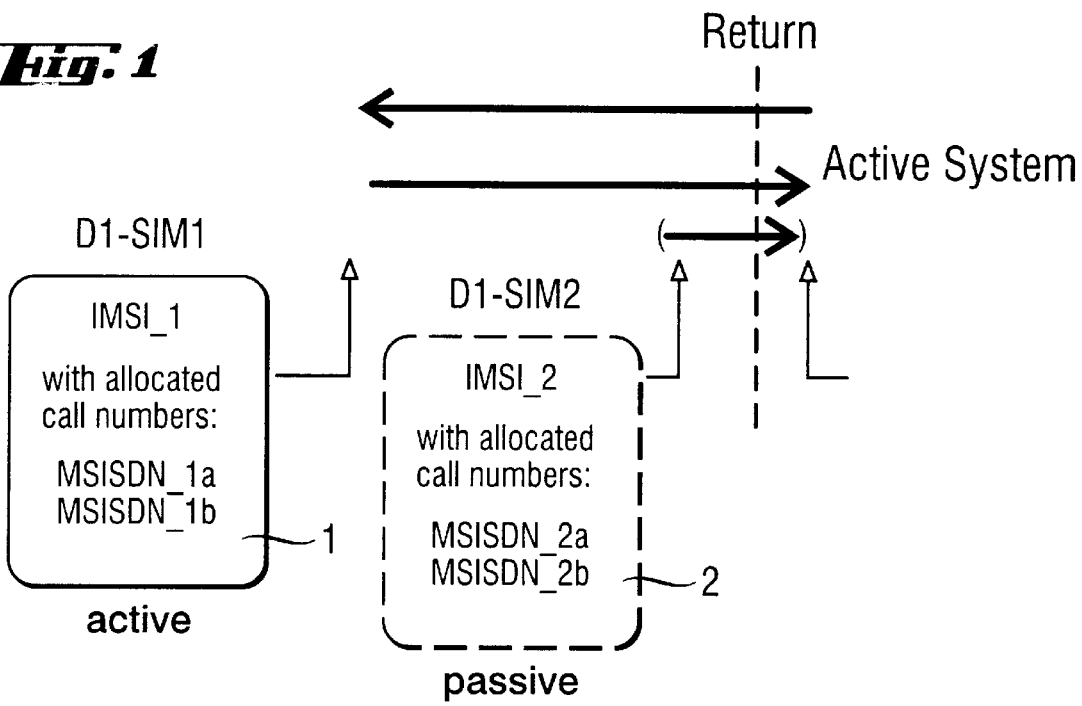

United States Patent [19]

Rast

[11] Patent Number: 5,819,176
[45] Date of Patent: Oct. 6, 1998

[54] PROCESS FOR OPERATING A MOBILE RADIOTELEPHONE SYSTEM UTILIZING SUBSCRIBER INDENTIFICATION MODULES

[75] Inventor: Corinna Rast, Bonn, Germany

[73] Assignee: DeTeMobil Deutsche Telekom MobilNet GmbH, Bonn, Germany

[21] Appl. No.: 557,090

[22] PCT Filed: Mar. 23, 1994

[86] PCT No.: PCT/EP94/00911

§ 371 Date: Apr. 22, 1996

§ 102(e) Date: Apr. 22, 1996

[87] PCT Pub. No.: WO94/28686

PCT Pub. Date: Dec. 8, 1994

[30] Foreign Application Priority Data

May 24, 1993 [DE] Germany ........................ 43 17 143.5

[51] Int. Cl.⁶ .................................................. H04Q 7/32
[52] U.S. Cl. .................. 455/422; 455/422; 455/424; 455/425; 455/432
[58] Field of Search .................................... 455/422, 432, 455/414, 411, 433, 424, 425

[56] References Cited

U.S. PATENT DOCUMENTS

| | | |
|---|---|---|
| 3,854,013 | 12/1974 | Altenbuger et al. . |
| 4,759,056 | 7/1988 | Akiyama . |
| 4,991,198 | 2/1991 | Tate et al. . |
| 5,040,177 | 8/1991 | Martin et al. . |
| 5,159,625 | 10/1992 | Zicker . |
| 5,206,899 | 4/1993 | Gupta et al. . |
| 5,210,787 | 5/1993 | Hayes et al. . |
| 5,307,400 | 4/1994 | Sawyer et al. . |
| 5,353,331 | 10/1994 | Emery et al. . |
| 5,371,493 | 12/1994 | Sharpe et al. . |
| 5,400,390 | 3/1995 | Salin . |

FOREIGN PATENT DOCUMENTS

| | | |
|---|---|---|
| 0503151 | 12/1991 | European Pat. Off. . |
| 32 12 023 | 10/1983 | Germany . |
| 38 27 698 | 12/1989 | Germany . |
| 34 10 937 | 8/1991 | Germany . |

*Primary Examiner*—Dwayne D. Bost
*Assistant Examiner*—L. C. Scott
*Attorney, Agent, or Firm*—Baker & Daniels

[57] ABSTRACT

In a process for operating a mobile radiotelephone system in which mobile stations are actuated with the aid of an identification number transmitted from the mobile station concerned to an active system in that, after the identification number has been checked in the active system in a data set which contains at least the identification number and a call number allocated thereto, a status field is set to "active", and in which, on the receipt of a request for connection with a call number the active system checks whether that call number is active, in which, if there is a match, a connection is made using the call number, the data set contains a reference to a further data set which contains a further identification number, a further call number, a further status field and a reference to the data set. When a request for connection to the call number is received, if the latter is not active, a connection is made using the further data set if it is active.

14 Claims, 2 Drawing Sheets

PROCESS FOR OPERATING A MOBILE RADIOTELEPHONE SYSTEM UTILIZING SUBSCRIBER INDENTIFICATION MODULES

The invention relates to a method for operation of a mobile radio network according to the preamble of claim 1.

At identification by the identification number, the latter usually stored in a subscriber identification module, the subscription[1] is verified with the aid of an authentication code stored as well in the subscriber identification module. The subscriber identification modules—briefly called SIM—may be fashioned as a card with an integrated circuit as memory—hereafter called telecard, or also card—or as a plug-in SIM.

Increasing popularity of mobile radiotelephones spawns among subscribers the desire for being reachable under a common phone number also when several mobile radiotelephones are used. In mobile radio networks according to the GSM standard this cannot be accomplished by issuing to the subscriber two identical telecards with the same assigned phone numbers. The safety concept of the GSM standard does not permit the setup and operation of two identical subscriber identification modules with identical identification numbers and authentication codes.

The document WO 92/19078 A1 describes a method for operation of a mobile radio network where a subscriber identiy module (SIM) is provided with at least two user identities that can be activated by the user selectively. Thus, only one user identity can be active presently. When a call arrives for the identity that is not active, this call is relayed to the active subscriber identity by means of the GSM function "call forwarding unconditional" (CFU). The CFU function is limited to call forwarding, leading in the case of subscribers desiring more than to identities to problems.

WO 93/03585 A1 describes a telecommunication system where each mobile telephone of a specific group has certain call characteristics assigned to it, which determine, e.g., the length of time, point in time, and type of a call. These call parameters can be controlled centrally for each mobile station.

Known from EP 0 481 714 A2 is a method for identification of subscribers of a cellular telephone network that shows how a user making use, e.g., for the first time of an exchange smart card can be recognized and registered in the telephone system without difficulty. The problem involved is that the subscriber identity changes upon receipt of an exchange smart card and, to begin with, it is known only to the home location register (HLR). The method now provides for acquiring, by the addressed visitor location register (VLR), at first-time use of an exchange smart card the new identity immediately from the home location register (HLR).

The older patent application WO 94/08433 A1 with priority date of Oct. 1, 1992, published on Apr. 14, 1994, describes a digital mobile phone system in which each subscriber is assigned a phone number and several user identity modules (SIM). Each of these subscriber cards enables the use of a mobile telephone for making and receiving calls, wherein only one of the subscriber cards can be activated presently while the other is deactivated. For control of the activation of the individual subscriber identity modules, the home location register (HLR) is queried.

The objective underlying the present invention is to provide a method for operation of mobile radio network in which subscribers are able to operate two or, as the case may be, several radio telephones with different subscriber identification modules and can be reached under a common calling number.

This objective is accomplished according to the invention by the technical teaching of claim 1.

The advantage of the inventional method is that the subscriber with two telecards issued can be reached alternatively on both telecards via a common number and needs to disseminate only one phone number. Also in the case of outgoing calls, i.e., with the subscriber dialing, a called subscriber can be presented an identical caller number from both cards, with the aid of the "Calling Number Identification Presentation" service.

A further advantage of the inventional method is that all special services, such as call forwarding, that are available according to the GSM standard are possible also with the inventional method.

In the framework of the inventional method, extensive options as such are available with the respective telecard that is not in use (passive card). Provisions may be, e.g., that outgoing calls can be carried out with both cards simultaneously. But incoming calls are routed merely to the mobile station with the active card.

An advancement of the invention, therefore, provides for deactivation of the other record as one of the records is activated. Provisions in that case are that . . . [German text breaking off]. method insofar as an already forwarded call can, with the first telecard passive, be routed to the second telecard. Further restrictions of the GSM standard that are applicable, e.g., to call forwarding, do not exist with the inventional method. For example, "short messages" can be allowed for with the inventional method.

A preferable provision with the inventional method is that outgoing calls are allowed also from a mobile station with an identification number that is not active.

A favorable system for the application of the inventional method is characterized in that the mutual references of linked records are stored in the Home Location Register of the operating network, and that two subscriber profiles are interlinked in an Operation Subsystem system (OSS) for subscriber management.

An exemplary embodiment of the invention is illustrated in the drawing with the aid of several figures and explained in more detail in the following description.

Figure 2:
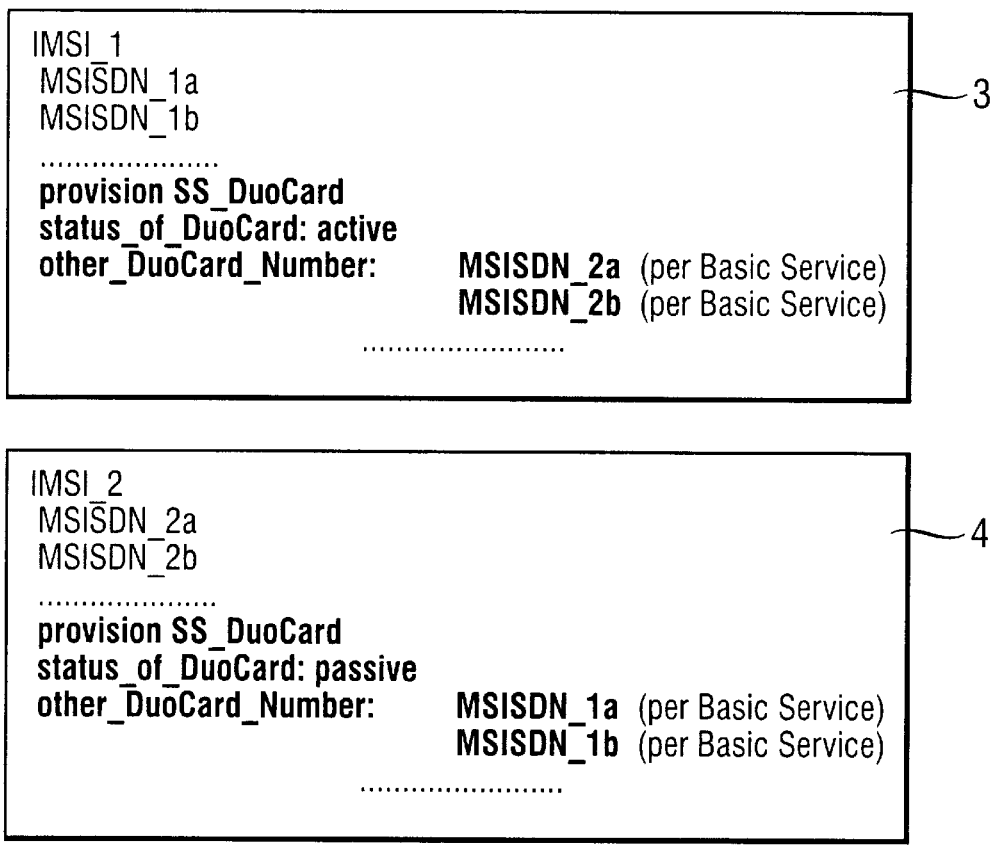
Figure 3:
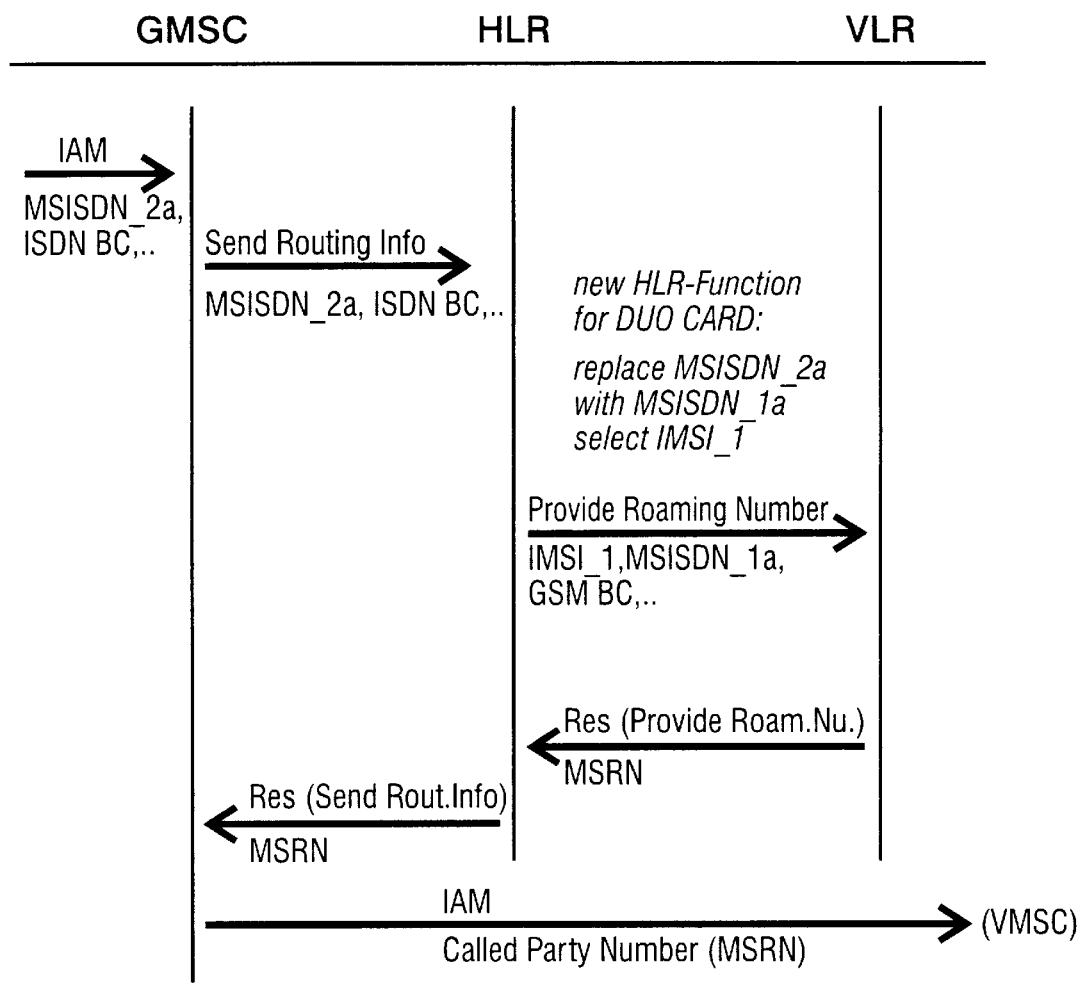

FIG. 1 shows a schematic illustration of two subscriber identification modules and their use in the inventional method;

FIG. 2, tabular representations of records for the two identification numbers; and FIG. 3, a schematic illustration of the method's sequence in the case of a call destined for a mobile station.

The application of the inventional method requires modifications in the operating network and in the management system (OSS=Operation Subsystem). The modifications within the operating network relate to the Home Location Register (HLR) in which the two records pertaining to two subscriber identification modules 1, 2 (FIG. 1) are linked.

Assigned to the subscriber identification module 1 is an identification number IMSI1 and two calling numbers MSISDN__1a and MSISDN__1b. Accordingly, the identification number IMSI2 and the calling numbers MSISDN__2a and MSISDN__2b pertain to the subscriber identification module 2. The communication between the operating network and the mobile radiotelephones, respectively the subscriber identification modules, takes place via a radio interface Um.

In conjunction with FIG. 1 it is assumed that the subscriber identification module 1 is active. Possible with it are outgoing and incoming calls. With a mobile radiotelephone with a passive subscriber identification module 2, the illustrated embodiment, or illustrated state, allows merely outgoing calls. A change between the two telecards can be controlled selectively by the subscriber by an activation report.

The modifications required for the application of the inventional method in the operating network relate exclusively to the functionality in the Home Location Register. The signaling protocols remain unchanged, for the exchange of unstructured data from a mobile station to the Home Location Register is supported in both phase 1 and phase 2 of the GSM standard. The functionality in the operating network provides for a transparent response relative to unstructured data, so that no changes in specification are required here either, if the generation of billing data for the subscriber activation is waived.

Subscriber data handling takes place in the OSS management system, with the subscriber profiles being extended by two records for the application of the inventional method, that is, two subscriber profiles are interlinked and the appropriate data transferred to the Home Location Register. Since the existing system already provides for several subscriptions for each client, no changes are required in that respect. Merely a special fee, if any, for subscribers with several cards reached under a common number needs to be provided for.

FIG. 2 shows by way of excerpt two records interlinked for application of the inventional method. The service provided with the inventional method will be referred to as DUO CARD hereafter. Stored in the first record 3 are the data of the first subscriber identification module 1 (FIG. 1). In setting up a subscription, the fields "provision SS_DuoCard", "status_of_DuoCard" and "other_DuoCard_Number" are set; when the provision for "DuoCard" is given, the service is automatically active. The record 4 for the second subscriber identification module 2 (FIG. 1) is set up accordingly. The status for one identification number is active, for the other it is passive.

The following illustrates with the aid of FIG. 3 the establishment of a connection on the example of a call originating from a fixed network and destined for a mobile station. The call enters at an interface GMSC between a fixed network and the mobile radio network and contains, for example, the number MSISDN_2a and the parameters ISDN BC.., which determine the type of service, for example voice or fax.

A request "Send Routing Info" is issued here to the Home Location Register HLR. In the case of the additional service DUO CARD provided for an with passive status for MSISDN_2a, the calling number MSISDN_2a is replaced by MSISDN_1a and IMSI_1 is selected. With it, a "Roaming Number" is determined in the Visitor Location Register VLR and relayed to the Home Location Register, whence the complete Routing Information is issued to the GMSC interface. There, the connection is established via the respective Visited Mobile Services Switching Center VMSC.

Activation by the subscriber takes place with Process_Unstructured_SS-Data from the mobile station, transparent to the Home Location Register. This is possible with GSM phase 1 and GSM phase 2. To begin with, Home Location Register verifies the provision for DUO CARD and retrieves the status. Activation for an active card is ignored. In activating a passive card, the status_of_DuoCard is converted for both identification numbers.

When outgoing calls are meant to be prevented with the use of the passive card, "Operator Barring for DuoCard" is differentiated from the general "Operator Barring." To that end, Home Location Register verifies whether "Operator Barring" is set for the card active up to that point—that is, whether the general "Operator Barring" was initiated. In this case, the status_of_DuoCard remains unchanged for both identification numbers. In the other case, "Operator Barring" is set for the new passive card and canceled for the new active card.

It is also possible to update in the activation procedure specific subscriber data in the Home Location Register and to transfer values from the old active to the new active identification number, for example call forwarding settings, call barring settings (usage restrictions) including password as well a further Supplementary Service data.

Mutual restrictions between call forwarding and DUO CARD services are not created. An HLR-DUO CARD rerouting to a calling number of the other DUO CARD has no effect on the sequence of the call forwarding service. In a call forward registration of the subscriber it is not necessary to verify whether a number of the other DUO CARD was entered as target of rerouting. But with the call forwarding settings meant to be transferred upon DUO CARD report from one identification number to the other identification number, the case can occur that for the one identification number a call rerouting to the own number is stored in the Home Location Register. The maxium number of call reroutings per connection being limited to 1 in the D1 network, the consequences are acceptable from the vantage point of the network operator. The consequences for the subscriber are minor as well—with Call Forwarding On No Reply activated on the active card, the call—as the case may be—would be forwarded twice.

Additionally it is possible at ongoing calls to present to the called subscriber from both cards an identical caller number with "Calling Line Identification Presentation." The calling numbers of the second card may then remain entirely hidden from third parties. Realizing this requires that Home Location Register provide a common calling number (BASIC MSISDN) for both identification numbers; this necessitates changing the HLR function "Selection of BASIC MSISDN" and, as the case may be, also a modification in the subscriber data management of the DPPS (Data Post Processing System).

I claim:

1. Method for operation of a mobile radio network where mobile stations, with the aid of an identification number (IMSI_1) assigned to a subscriber identification module (SMI1) transmitted by the mobile station to the mobile radio network, are activated by setting, upon verification of this identification number (IMSI_1), in a record (3) assigned to the identification number (IMSI_1), in which record there are stored at least the identification number (IMSI_1), at least one pertaining calling number (MSISDN_1a, MSISDN_1b) and subscriber service data, a status field (status_of_DuoCard) to "active," and where upon request for connection with a calling number the mobile radio network verifies whether this calling number is active and, if affirmative, a connection is established using the calling number, characterized in that in the record (3) there is stored a reference to a further record (4) that is assigned to a further subscriber identification module (SIM2) and comprises a further identification number (ISMI_2), at least one further calling number (MSISDN_2a, MSISDN_2b), a further status field (status_of_DuoCard), subscriber service data and a reference to the record (3), and in that at receiving the request for a connection with the calling number—if that number is not active—a connection is made using the further record (4), provided said record is not active—and at least part of the service data are at activation change of one of the records (3, 4) exchanged between the records (3, 4).

2. Method according to claim 1, characterized in that at activation of one of the records the other record is deactivated.

3. Method according to claim 2, characterized in that an activation of one of the records, while the other record is active, is possible only by entering a preset command.

4. Method according to claim 1, characterized in that the records contain each two calling numbers, or two further calling numbers for different services.

5. Method according to claim 4, characterized in that the subscriber service data comprise information on usage restriction.

6. Method according to claim 5, characterized in that outgoing calls are allowed also from a mobile station with an inactive identification number.

7. Method according to claim 1, characterized in that the records linked by the mutual references are stored in the Home Locations Register of the operating network, and in that two subscriber profiles are interlinked in an Operation Subsystem (OSS) for subscriber administration.

8. Method according to claim 2, characterized in that the records contain each two calling numbers, or two further calling numbers for different services.

9. Method according to claim 3, characterized in that the records contain each two calling numbers, or two further calling numbers for different services.

10. Method according to claim 2, characterized in that the records linked by the mutual references are stored in the Home Locations Register of the operating network, and in that two subscriber profiles are interlinked in an Operation Subsystem (OSS) for subscriber administration.

11. Method according to claim 3, characterized in that the records linked by the mutual references are stored in the Home Locations Register of the operating network, and in that two subscriber profiles are interlinked in an Operation Subsystem (OSS) for subscriber administration.

12. Method according to claim 4, characterized in that the records linked by the mutual references are stored in the Home Locations Register of the operating network, and in that two subscriber profiles are interlinked in an Operation Subsystem (OSS) for subscriber administration.

13. Method according to claim 5, characterized in that the records linked by the mutual references are stored in the Home Locations Register of the operating network, and in that two subscriber profiles are interlinked in an Operation Subsystem (OSS) for subscriber administration.

14. Method according to claim 6, characterized in that the records linked by the mutual references are stored in the Home Locations Register of the operating network, and in that two subscriber profiles are interlinked in an Operation Subsystem (OSS) for subscriber administration.

* * * * *